Dec. 16, 1969    G. E. FENNER    3,484,713
TWO-STAGE SEMICONDUCTOR COHERENT RADIATION SOURCE
Filed April 3, 1964
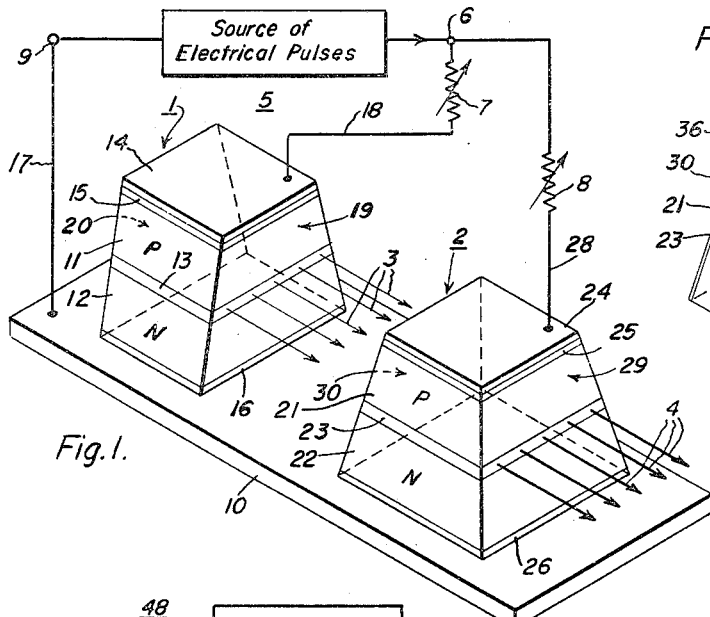
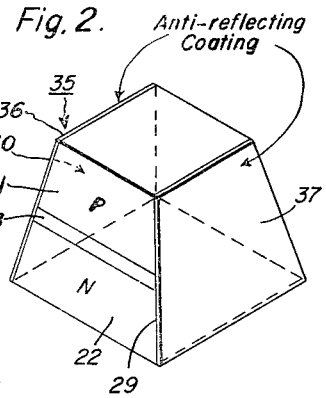
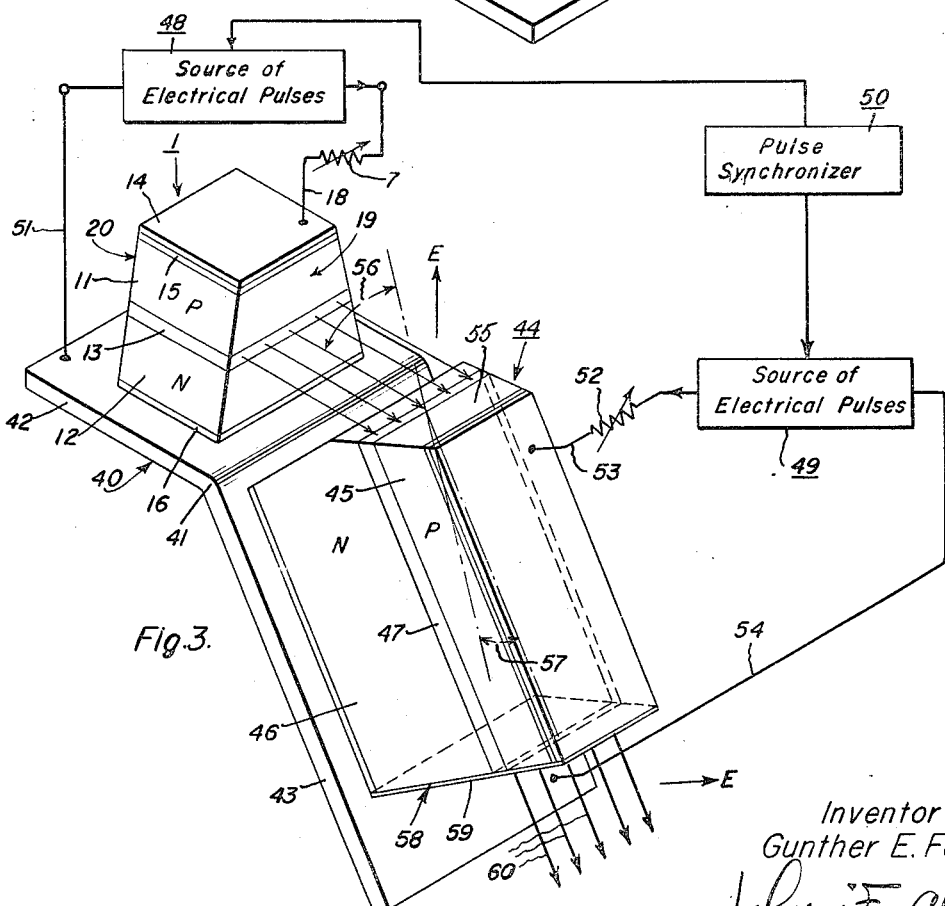
Inventor:
Gunther E. Fenner,
by John F. Ahern
His Attorney.

United States Patent Office 3,484,713
Patented Dec. 16, 1969

3,484,713
TWO-STAGE SEMICONDUCTOR COHERENT RADIATION SOURCE
Gunther E. Fenner, Schenectady, N.Y., assignor to General Electric Company, a corporation of New York
Filed Apr. 3, 1964, Ser. No. 357,188
Int. Cl. H01s *3/18*
U.S. Cl. 331—94.5            9 Claims

ABSTRACT OF THE DISCLOSURE

A semiconductor junction laser and a monocrystalline semiconductor junction diode of similar configuration but without a Fabry-Perot cavity therein are situated in close proximity to each other and arranged so that light from the laser passes coplanarly through the junction of the diode. Since the laser receives sufficient excitation to generate coherent radiation, while the diode receives sufficient excitation to create a population inversion within the junction region thereof but insufficient to generate stimulated coherent radiation, the diode amplifies the output of the laser.

---

The present invention relates to systems for providing coherent radiation, and more particularly pertains to systems of this type utilizing semiconductive devices and providing high power coherent radiation.

The discovery of means to provide coherent radiation of light, or light having uniform wave properties, has enabled the use of light in many ways previously exclusively reserved for radiation in the radio frequency spectrum and has extended the usefulness of electromagnetic radiation beyond heretofore known applications, owing in part to the very short wavelength of coherent radiation now obtainable. Semiconductor diodes adapted to provide generation of stimulated coherent radiation are described in an article entitled "Coherent Light Emission From P-N Junctions" appearing in Solid-State Electronics, vol. 6, page 405, 1963, that is intended to be incorporated herein by reference thereto. Diodes of this type are referred to herein as semiconductor junction lasers and are disclosed and claimed in U.S. patent application Ser. No. 232,846, filed Oct. 24, 1962, now Patent No. 3,245,002 issued Apr. 5, 1966 and assigned to the assignee of the present invention.

The discovery of the semiconductor junction laser enabled more efficient generation of stimulated coherent radiation of light, not necessarily visible but infrared as well, and also of microwave frequencies, utilizing less complex equipment. In some applications, requiring a high power coherent light source, it is desirable that oscillation in un-used, or spurious, modes be prevented or reduced in intensity and that background light, or super-radiance, be suppressed. Such reduction and suppression is achieved conveniently by providing excitation for the laser that is greater than, but does not substantially exceed, the threshold excitation at which oscillations are first produced. The latter condition, of course, does not favor production of high power coherent radiation and it is highly desirable to to provide a system including a laser operated only slightly above, or substantially at, its threshold level and capable of providing high power coherent radiation.

Accordingly, it is an object of my invention to provide a high power coherent radiation source;

Another object of my invention is to provide a high power coherent radiation source utilizing semiconductor devices;

Still another object of my invention is to provide a high power coherent radiation source featuring a low power semiconductor laser and means to amplify the intensity of radiation therefrom.

Briefly, in accord with one embodiment of my invention I provide first and second bodies of essentially the same monocrystalline semiconductive materials. Each body includes a planar P-N junction region, and the bodies are positioned relative to one another such that the junction regions are coplanar. The first body is electrically excited above its threshold level to provide emission of coherent radiation which impinges upon the junction region of the second body. The second body is excited below its threshold level and adapted to provide amplification of the coherent radiation received without altering the characteristics thereof, as by ensuring that opposing surfaces of the second body are non-parallel and, preferably, non-reflecting. Thus, coherent radiation entering the second body through one face thereof is amplified in the P-N junction region of the second body and exits from the opposing surface thereof with increased power.

The features of my invention that I believe to be novel are set forth with particularity in the appended claims. My invention itself, however, both as to its organization and method of operation, together with further objects and advantages thereof, may best be understood by reference of the following description taken in connection with the accompanying drawing in which:

FIGURE 1 is a perspective view of a typical high power coherent radiation source in accord with my invention;

FIGURE 2 is a perspective view of an alternative embodiment of the semiconductor amplifying device shown in FIGURE 1; and, FIGURE 3 is a perspective view of an alternative embodiment of a high power coherent radiation system in accord with the present invention.

The high power coherent radiation source illustrated in FIGURE 1 comprises a semiconductor junction laser 1 and a semiconductor junction radition amplifier 2 positioned to receive the radiation 3 from laser 1 and to provide an amplified coherent radition output 4. Suitable excitation for laser 1 and amplifier 2 is shown schematically as including a source of unidirectional electrical pulses 5. Adjustment of the relative magnitude of excitations is facilitated by connecting output terminal 6 of source 5 to laser 1 and amplifier 2 through respective adjustable series resistors 7 and 8. A return path to ground terminal 9 of source 5 is conveniently completed through a common header 10, of conductive material, that interconnects and supports both semiconductive devices. Conductor 17 effects the connection between ground terminal 9 and header 10.

The semiconductor junction laser 1 of FIGURE 1 comprises a monocrystalline body of semiconductive material having a degenerately impregnated, or doped, P-type region 11 and a degenerately impregnated, or doped, N-type region 12, these regions being separated by a narrow P-N junction region 13. Non-rectifying contact is made between the P-type region 11 and a first electrode 14 by means of an acceptor type, or electrically neutral, solder layer 15 and a non-rectifying connection is made between N-type region 12 and header 10 by means of a donor type, or electrically neutral, solder layer 16. Conductors 17 and 18 are connected to header 10 and electrode 14, respectively, as, for example, by welding, brazing, etc. Opposed surfaces 19 and 20 of laser 1 are advantageously ground and polished to exact parallelism in order that a standing wave pattern may be readily set up within the semiconductor crystal in junction region 13 for the attainment of high efficiency coherent radiation emission. In such event, the resulting parallel reflecting surfaces 19 and 20 are known in the art as Fabry-Perot reflecting faces.

Amplifier 2 comprises a monocrystalline body of semiconductive material having a degenerately impregnated, or doped, P-type region 21 and a degenerately impregnated, or doped, N-type region 22, these regions being separated by a P-N junction region 23. As in laser 1, non-rectifying contact is made between the P-type region 21 and a first electrode 24 by means of an acceptor type or electrically neutral solder layer 25 and a non-rectifying connection is made between N-type region 22 and the header 10 by means of a donor type or electrically neutral solder layer 26. Conductor 28 is connected to electrode 24 as, for example, by welding, brazing, etc. Opposing surfaces 29 and 30 of amplifier 2, that correspond generally in relative spatial relationship to surfaces 19 and 20, respectively, of laser 1 are, however, not ground and polished to exact parallelism for reasons to be explained presently.

The intersection of P-N junction region 23 and surface 30 is spaced in the direction of radiation 3 from laser 1 and, preferably, though not necessarily, P-N junction region 13 and P-N junction region 23 are substantially coplanar in the case where the respective P-N junction regions are flat, as illustrated in FIGURE 1. In order to enhance the coupling of radiation from laser 1 to amplifier 2, the spacing between surfaces 19 and 30 is advantageously made very small and, preferably, in the range from 10 to 200 wavelengths of the emission from laser 1. Spacing below this range tends to reduce the efficiency of surface 19 as a Fabry-Perot reflector, and spacing appreciably greater than 200 wavelengths in many cases requires the addition of auxiliary optical focusing lenses that are normally advantageously obviated.

In accord with the present invention, amplifier 2, of the high power coherent radiation system, is adapted to provide colinear amplification of coherent radiation entering its P-N junction 23. The terms "colinear amplification" and "colinear amplifier" as used herein and in the appended claims are intended to specify that radiation entering the P-N junction region of amplifier 2 progresses in substantially the same direction in which it commences initial travel, following the P-N junction region while gaining in intensity, until transition of the P-N junction region is completed and the radiation exits from the junction region, at the opposite surface from which it was received, in amplified form without producing regeneration. Colinear amplifier 2 can be considered to supply increasing power to a unidirectionally travelling wave of energy. Reflection of radiation that could lead to regeneration within amplifier 2 is minimized, as is reflection back to laser 1 of radiation that has entered the P-N junction region of amplifier 2. Thus, positive feedback within amplifier 2 and signal feedback from amplifier 2 to laser 1 are both minimized when amplifier 2 is a "colinear amplifier" within the meaning herein.

In the system of FIGURE 1, amplifier 2 is adapted to provide colinear amplification by ensuring that surface 29, from which the amplified high powered coherent radiation exits, is not parallel to surface 30, upon which radiation 3 from laser 1 first impinges, and by adjusting resistor 8 so that sufficient electrical excitation is received by junction region 23 to create a population inversion within junction region 23 but at a level below the threshold at which stimulated coehrent radiation might be generated within junction region 23. Preferably, each of the plurality of surfaces of amplifier 2 which intersect junction region 23 is essentially non-parallel with respect to any other such surface to reduce regeneration.

It is important that amplifier 2 be adapted to provide colinear amplification for a number of reasons including minimizing the effect of amplifier 2 upon the character of the radiation emitted by laser 1, other than providing the desirable increase in power level, and securing maximum output power from amplifier 2. Colinear amplification improves the fidelity of response of amplifier 2 and promotes output radiation therefrom closely resembling the received radiation, in characteristics other than power level, and minimizes the effect of many parameters of the system, as the dimensions of amplifier 2 and spacing thereof from laser 1, upon the frequency, polarization and spectral characteristics of the coherent radiation emitted by laser 1.

While positive feedback can be introduced in amplifier 2, as by promoting internal reflection at surface 29, to provide a higher gain, or amplification factor, for amplifier 2, this is undesirable in the amplifier for use in the present invention because such increased gain is achieved at the expense of increasing the effect of the various parameters of the amplifier upon the resultant high power radiation output.

Adaption of amplifier 2 to provide colinear amplification also increases the level of output obtainable from the system. This is thought to be because there is a predetermined fixed number of electrons that are injected into the conduction band by a given magnitude of excitation current. The power amplification factor, or gain, of amplifier 2 varies in the same direction as variations in the current density in the junction region. When reflected radiation, spurious radiation, or spontaneous oscillations are permitted to consume a proportion of the available injected electrons, the gain of amplifier 2, at the frequency of received radiation 3, is reduced.

The gain, or power amplification factor, of amplifier 2 is advantageously increased, without introducing undesirable reflections, or positive feedback, by increasing the length of the junction region in the direction of received radiation. In general, the intensity of radiation traveling through the P-N junction region of amplifier 2 increases exponentially with distance traveled and, hence, a relatively small increase in the length of the junction region in the direction of wave propagation results in a substantial increase in the level of useful output power obtainable.

The material from which laser 1 and amplifier 2 are fabricated is normally monocrystalline and may be composed in general of a compound semiconductor or an alloy of compound semiconductors from the Group III–V (of the Periodic Table) class which are denominated as Direct Transition Semiconductors (adapted to direct transitions of electrons between valence and conduction bands) and may include, for example, gallium arsenide, indium antimonide, indium arsenide, indium phosphide, gallium antimonide and alloys therebetween and may further include direct transition alloys of other materials such as alloys of gallium arsenide and gallium phosphide (indirect by itself) in the range of zero to approximately 50 atomic percent of gallium phosphide. For a further discussion of Direct Transition Semiconductors reference is hereby made to an article by H. Ehrenreich in the Journal of Applied Physics, vol. 32, page 2155, (1961). Other suitable direction transition semiconductive materials include lead sulphide, lead selenide and lead telluride. In these latter materials indium is suitable as a donor and excess anion is siutable as an acceptor. The wavelength of the emitted radiation depends upon the band gap (the energy difference between the conduction band and the valence band of the chosen semiconductor). The semiconductive materials of laser 1 and amplifier 2 are advantageously selected from materials having essentially the same band gap energy, and, preferably, laser 1 and amplifier 2 are fabricated from essentially the same semiconductive material.

Both the N-type and the P-type regions of semiconductor crystal 1 are impregnated or doped with donor or acceptor activators, respectively, to cause degeneracy therein. As such herein, a body may be considered to be degenerate N-type when it contains a sufficient concentration of excess donor impurity carriers to raise the Fermi level thereof to a value of energy higher than the minimum energy of the conduction band on the energy band diagram of the semiconductive material. In a P-type semiconductor body or region, degeneracy means that a sufficient concentration of excess acceptor impurity carriers exist therein to depress the Fermi level to an energy lower than the maximum energy of the valence band and on the energy band diagram for the semiconductive material. Degeneracy is usually obtainable when the excess negative conduction carrier concentration exceeds $10^{17}$ per cubic centimeter or when the excess positive conduction carrier concentration exceeds $10^{18}$ per cubic centimeter. The Fermi level of such an energy band diagram is that energy at which the probability of there being an electron present in a particular state is equal to one half.

The materials suitable for rendering degenerately N and P-type the various semiconductors with which the devices of the present invention are constructed depend upon the semiconductive material utilized and are not necessarily the same in each case, even though the materials may be included in the same class. Thus, all of the Group III–V Periodic Table compounds utilize sulphur, selenium and tellurium as donors and zinc, cadmium, mercury and ceasium as acceptors, on the other hand, the elements 10, germanium and silicon may serve either as donors or acceptors depending upon the particular semiconductor and the method of operation. For example, in gallium antimonide grown from a stoichiometric melt they are all acceptors. In indium antimonide, tin is a donor, whereas germanium and silicon are acceptors. In the remaining direct transition semiconductors of the Group III–V type, tin, germanium and silicon are all donors. Any donor and acceptor pair that have sufficiently high solubility for the material utilized to form the semiconductor crystal may be utilized to form the degenerately impregnated or doped regions of laser 1 and amplifier 2.

While a number of methods are suitable for fabrication of the semiconductor junction laser 1 and semiconductor junction colinear amplifier 2 of the high power coherent radiation source of the present invention, the following example is intended to illustrate a particularly conveneint method to those skilled in the art. A system as shown in FIGURE 1 is constructed by providing an elongated flat wafer from a monocrystalline ingot of N-type gallium arsenide which is impregnated or doped with approximately $10^{18}$ atoms per cubic centimeter of tellurium. The impregnation or doping is achieved, conveniently, by growth from a melt of gallium arsenide containing at least $5 \times 10^{18}$ atoms per cubic centimeter of tellurium to cause the resulting crystal to be degenerately N-type. A P-N junction region is formed in a horizontal surface-adjacent region of the crystal by diffusing zinc into all surfaces thereof at a temperature of approximately 900° C. for approximately one half hour using an evacuated sealed quartz tube containing the gallium arsenide crystal and 10 milligrams of zinc. The P-N junction so formed is approximately 0.05 millimeter below surfaces of the crystal. The crystalline wafer is then cut and ground to remove all of the P-type region except for the region adjacent one horizontal surface.

Two bodies are then cut from the crystal. The first body, that is to be used for fabrication of laser 1, is typically 0.5 millimeter thick and 0.4 millimeter along each edge. The second body, that is used for the fabrication of semiconductor junction amplifier 2, is typically 0.5 millimeter thick, 0.4 millimeter along the edges that are transverse to the direction in which the junction extends linearly and in which direction propagation of radiation to be amplified travels, and any desired length along the other edges that provides the required junction area and length of propagation path to meet the output power capability desired from amplifier 2. Typically, the latter dimension is from 0.2 to 2 millimeters in length.

Two opposing faces of the first crystal body are then cleaved or polished to optical smoothness, to substantially exact parallelism, and to be perpendicular to the P-N junction region.

The crystal bodies are conveniently, though not necessarily, mounted on a common header fabricated from a good electrical and thermal conductor as copper, silver, or aluminum. Thereafter the respective electrodes are soldered to the semiconductive bodies. With the aforementioned gallium arsenide semiconductive material, a suitable acceptor solder is an alloy of three weight percent zinc, remainder being indium. A suitable donor solder is tin, for example. The crystal bodies are positioned on the header, for a system as shown in FIGURE 1, such that the junctions are coplanar.

In operation, laser 1 and amplifier 2 of FIGURE 1 are advantageously subjected to pulses of direct current at high current density. The pulse width to avoid overheating is conveniently kept to a duration of approximately 1 to 10 microseconds. Since it has been found that the threshold for stimulated coherent light emission from gallium arsenide diodes, for example, is related to the temperature of the diode, it may be convenient to subject laser 1 and amplifier 2 to a low temperature to lower the threshold for coherent emission and preclude the necessity of a high current source, as well as to enable continuous operation in many cases. Also, CW operation is advantageously achieved by fabricating laser 1 in accord with the invention of U.S. patent application Ser. No. 299,220, filed Aug. 1, 1963 and assigned to the assignee herein.

When the semiconductor junction devices are of gallium arsenide and immersed in a Dewar of liquid air at a temperature of approximately 77° K. the threshold for coherent emission occurs at approximately 1000 amperes per square centimeter and decreases to less than 100 amperes per square centimeter at 20° K. When the junction areas of laser 1 and amplifier 2 are each selected to be approximately .001 centimeter$^2$, a 2 ampere electrical source is sufficeint at 77° K., as is a 0.2 ampere source at 20° K.

A convenient method for operating the system of FIGURE 1 is to adjust variable resistors 7 and 8 to their respective maximum values of resistance and to energize the source of electrical pluses 5. Resistor 7 is thereafter adjusted to provide a decrease in resistance that results in an increasing current density within the junction region of laser 1. The light output from laser 1 will be observed to increase substantially linearly with increasing current density and to be incoherent. Thereafter, with continued decrease in the equivalent series resistance of resistor 7, the light output from surface 19, or surface 20 (in the event that the latter is not coated to be totally internally reflecting) inrceases non-linearly and suddenly becomes coherent. Coherence is indicated by diffraction patterns perpendicular to the plane of the junction indicating a definite phase relationship between light emitted from different lateral portions of the P-N junction region 13 of laser 1. For use in accord with the present invention, laser 1 is operated substantially at the threshold for coherent radiation, i.e., at the current density where coherent radiation commences. Thereafter, variable resistor 8 is continuously adjusted to provide decreasing series resistance until the desired intensity of coherent radiation is emitted from surface 29 of amplifier 2. Thus, the P-N junction region of amplifier 2 is forward-biased sufficient to create a population inversion therein. Of course, amplifier 2 is confined to current densities below its threshold for coherent radiation so that only colinear amplification of the radiation received from laser 1 occurs in the P-N junction region 23 of amplifier 2. The received radiation is readily doubled in intensity when the length of junction region 23 in the direction of propagation is only about 0.4 millimeter.

FIGURE 2 is a partial view of a colinear amplifier 35 featuring anti-reflecting coatings 36 and 37, but otherwise being identical to amplifier 2 of FIGURE 1. Like reference numerals refer to like components, with the principal changes being herein noted. Anti-reflecting coatings 36 and 37, on surfaces 30 and 29, respectively, further adapt amplifier 35 to provide colinear amplification. Coating 37 oftentimes obviates the necessity of ensuring that surface 29 is not parallel to surface 30. Thus, the two monocrystalline bodies of FIGURE 1 can have similar shapes when coating 37 is provided. Coating 35, in addition to reducing internal reflections, also increases the efficiency of the amplifier in receiving radiation directed to its P-N junction region from laser 1. When the transverse dimension of junction 23, relative to the direction of desired wave propagation, is comparable in magnitude to the length of junction region 23 in the direction of propagation, anti-reflecting coatings are advantageously provided on the side surfaces to inhibit oscillation in transverse modes.

The anti-reflecting coatings are advantageously selected to have thicknesses that are about equal to odd multiples of one-quarter wavelength in the direction of wave propagation. A particularly desirable material for the anti-reflecting coatings is silicon monoxide that may be readily evaporated on the surfaces of the amplifier by well-known techniques. Silicon monoxide provides surface passivation of gallium arsenide, for example, and in addition possesses an index of refraction intermediate that of, air and gallium arsenide. The latter characteristic is highly desirable to provide a smooth optical transition into and out of the semiconductive body. Ideally, the refractive index of the material used for the anti-reflecting coating is equal to the square root of the refractive index of the semiconductive body when transmission is into or from vacua, air or other gases (having a refractive index substantialy equal to 1). The anti-reflecting coating is equally advantageously selected to comprise a plurality of layers, as is well-known in the art.

FIGURE 3 illustrates an alternative embodiment of a high power coherent radiation source in accord with the invention. The system includes a laser body 1, substantially as shown and described in FIGURE 1, mounted on a header 40, of conductive material. Header 40 is bent along a transverse section 41 thereof to provide two angularly related portions 42 and 43. A colinear amplifier 44 is provided having a degenerately P-type region 45 and a degenerately N-type region 46 with a planar P-N junction region 47 located between and contiguous with regions 45 and 46.

Unlike the system of FIGURE 1, separate sources of electrical pulses 48 and 49 are provided for laser 1 and amplifier 44, respectively. The pulses from sources 48 and 49 are triggered in response to electrical signals received from a pulse synchronizer 50 that is, conveniently, adjustable to control the time relationship between the pulses delivered by sources 48 and 49. Source 48 is connected to laser 1 through adjustable series resistor 7 and conductor 18 with the return path being completed by conductor 51 that is connected to portion 42 of header 40. In like manner, source 49 is connected to amplifier 44 through adjustable series resistor 52 and conductor 53 with the return path being provided by conductor 54 that is connected to portion 43 of header 40. It is not required that header 40 be a continuous conducting member, although, it is preferred that header 40 be a continuous member in order to provide mechanical rigidity for the system.

The reason for separate sources of electrical pulses is to better electrically isolate the semiconductive bodies. Separate sources additionally provide a particularly convenient means for supplying radiation of very narrow output pulse widths when desired by adjusting pulse synchronizer 50 to provide only a relatively small controllable time of overlap between the pulses supplied by the two sources (pulse code modulation). Separate sources could be equally well utilized in the system of FIGURE 1. Preferably, synchronizer 50 is also adapted to provide a signal causing continuous excitation, when desired, of junction regions 13 and 47 by sources 48 and 49, respectively.

As described above, the present invention permits useful high power coherent radiation to be obtained when the laser 1 is excited only substantially at its threshold for stimulated coherent emission. Under these conditions, lasers oftentimes emit radiation that is not only coherent but also polarized. Normally, the direction of polarization is perpendicular to the plane of the P-N junction from which it is emitted.

The embodiment of my invention that is illustrated in FIGURE 3 provides high power coherent radiation 60 which is polarized. The direction of polarization, or electric field vector as shown, is perpendicular to the plane of junction region 47. Polarization of output radiation 60 is achieved though the radiation 3 from laser 1 is not polarized; however, a particularly efficient system is obtained when radiation 3 is polarized, as shown, in the plane of incidence upon radiation-receiving surface 55 of amplifier 44.

In accord with Brewster's law, when radiation polarized in the plane of incidence impinges upon a surface at the angle of incidence at which reflected rays would be perpendicular to refracted rays, essentially all of the radiation is refracted and none is reflected. Thus, the two semiconductive bodies are advantageously located relative to each other so that the angle 56 of incidence of radiation 3 upon radiation-receiving surface 55 is about equal to the complement of the angle 57 of refraction into amplifier 44 (i.e., the summation of angles 56 and 57 is approximately 90°) and surface 55 is cleaved or cut so that it intersects junction region 47 at an angle approximately equal to the angle 57 of incidence.

In the usual case where the index of refraction of the transmitting medium between the two semiconductive bodies is substantially equal to one, (as is the case in vacua, gas, liquid nitrogen and liquid oxygen, for example), angle 56 of incidence is advantageously selected to be essentially equal to the angle whose tangent equals the index of refraction of the semiconductive material from which amplifier 44 is fabricated. Thus, when the semiconductive material is gallium arsenide, for example, having an index of refraction of about 3.5, the bodies are located so that the angle of incidence is approximately 74°. The angle of refraction into junction region 47 is then approximately 16°.

When the conditions described above are fulfilled, by proper location of amplifier 44 relative to laser 1, and the radiation 3 is polarized in the plane of incidence, as illustrated, substantially all of the radiation enters junction region 47 without reflection from surface 55. No anti-reflecting coating is required on surface 55 and the bodies can be as closely spaced as mechanical limitations permit. Radiation received is propagated through region 47 with an exponentially increasing intensity and exits from surface 58, that is conveniently provided with an anti-reflecting coating 59. The high power output radiation 60 retains it characteristic of polarization in one direction because the amplifier 44 is adapted to provide colinear amplification.

While only certain preferred features of the invention have been shown by way of illustration, many modifications and changes will occur to those skilled in the art. It is, therefore, to be understood that the appended claims are intended to cover all such modifications and changes as fall within the true spirit and scope of my invention.

What I claim as new and desire to secure by Letters Patent of the United States is:

1. A high power coherent radiation source comprising: a first body and a second body of monocrystalline direct transition semiconductive materials, each body having a degenerate P-type region, a degenerate N-type region and a narrow P-N junction region located between and contiguous with said P-type and N-type regions; said first body being adapted to emit coherent radiation from its P-N junction region in at least one direction in response to electrical excitation thereof in excess of a predetermined threshold level; means connected to said first body for connection to a source of electrical energy to supply said excitation; said second body being spaced from said first body in said direction and located relative thereto to receive said coherent radiation in the P-N junction region of said second body; said second body providing colinear amplification of said coherent radiation entering its P-N junction region in response to electrical forward-biasing of said last-mentioned junction region of amplitude above the level to create a population inversion therein but below the level at which stimulated coherent radiation is generated therein; and, means connected to said second body for connection to a source of electrical energy to supply said forward-biasing, to provide high power coherent emission from said second body corresponding in frequency to the coherent radiation emitted from said first body.

2. The source of claim 1 wherein the narrow P-N junction regions of the first and second bodies are each substantially planar.

3. The source of claim 2 wherein the first and second bodies are located so that their respective junction regions are substantially coplanar.

4. A high power coherent radiation source comprising: a first body and a second body of monocrystalline direct transition semiconductive materials, each body having a degenerate P-type region, a degenerate N-type region and a narrow planar P-N junction region located between and contiguous with said P-type and N-type regions; said first body having at least two opposing surfaces that are essentially parallel to each other and substantially perpendicular to the junction region of said first body; said first body being adapted to emit coherent radiation from its P-N junction region through at least one of said two opposing surfaces in at least one direction in response to electrical excitation thereof in excess of a predetermined threshold level; means connected to said first body for connection a source of electrical energy to supply said excitation; said second body having a plurality of essentially non-parallel surfaces intersecting the junction region of said second body; said second body being spaced from said first body in said direction and located relative thereto so that said coherent radiation is directed to the P-N junction region of said second body through one of said plurality of essentially non-parallel surfaces the non-parallel surfaces of said second body being so oriented with respect to said parallel surfaces of said first body as to prevent reflection of said coherent radiation from a nonparallel surface of said second body back into the junction region of said first body; said second body providing colinear amplification of said coherent radiation entering its P-N junction region in response to electrical forward-biasing of said last-mentioned junction; and, means connected to said second body for connection to a source of electrical energy to supply said forward-biasing, to provide high power coherent emission from said second body corresponding in frequency to the coherent radiation emitted from said first body.

5. The source of claim 4 wherein said bodies are located relative to one another so that their respective junction regions are coplanar.

6. The source of claim 4 wherein said one of the plurality of essentially non-parallel surfaces carries an anti-reflecting coating at least in the region of intersection thereof with the P-N junction region of said second body.

7. The source of claim 6 wherein another one of said plurality of essentially non-parallel surfaces, that is approximately opposite said one surface, carries an anti-reflecting coating at least in the region of intersection thereof with the P-N junction region of said second body.

8. The source of claim 4 wherein said bodies are adapted and located relative to one another so that the angle of incidence of said radiation upon said one of said plurality of essentially non-parallel surfaces is substantially equal to the complementary angle of the angle of refraction of said radiation into the P-N junction region of said second body.

9. The source of claim 9 wherein another one of said plurality of essentially non-parallel surfaces, that is approximately opposite said one surface, carries an anti-reflecting coating at least in the region of intersection thereof with the P-N junction region of said second body.

References Cited

UNITED STATES PATENTS

| | | | |
|---|---|---|---|
| 3,245,002 | 4/1966 | Hall | 331—94.5 |
| 3,257,626 | 6/1966 | Marinace et al. | 331—94.5 |
| 3,292,102 | 12/1966 | Byrne | 331—94.5 |
| 3,295,911 | 1/1967 | Ashkin et al. | 331—94.5 |

RONALD L. WIBERT, Primary Examiner

U.S. Cl. X.R.

330—4.3